May 7, 1963  H. C. BAUMANN  3,089,118
PASSIVE SONAR DETECTION AND BEARING SYSTEM
Filed Oct. 10, 1960  2 Sheets-Sheet 2

Inventor
HAROLD C. BAUMANN.

By Borst & Borst
Attorneys

United States Patent Office 3,089,118
Patented May 7, 1963

3,089,118
PASSIVE SONAR DETECTION AND BEARING SYSTEM
Harold C. Baumann, Scotch Plains, N.J., assignor to Sperry Rand Corporation, Ford Instrument Company Division, Wilmington, Del., a corporation of Delaware
Filed Oct. 10, 1960, Ser. No. 61,568
4 Claims. (Cl. 340—6)

This invention relates to detection and bearing indication systems and particularly to sonar systems which yield target bearing information.

Hitherto sonar systems which give information as to bearing have employed an array of underwater transducers and complex sampling circuitry for gating the transducers to the receiver. It is an object of this invention to provide a relatively simple network of components which basically employ RDF principles of detection and indication though processing energy of substantially lower frequency than the radio frequencies used in the RDF systems. To this end, the instant system employs standard, nondirectional hydrophones as sound transducers and a receiver network which includes a goniometer type R.F. resolver in signal supplying and mechanical synchronizing control of a cathode ray tube indicator. Frequency transfer components are disposed in the network in association with the R.F. resolver so that the latter unit which can be designed with efficient transfer characteristics can be effectively used. The resolver output can produce signals having directional information and identification characteristics for audible, digital and correlation signal processing.

Another object of the invention is to provide sonar apparatus having sound transducer pickup and ambiguity resolved indication operative on radio frequency.

Other objects and advantages of the invention may be perceived on reading the following description of one of its embodiments which is taken in conjunction with the accompanying drawings in which FIG. 1 is a block diagram of the improved sonar system;

Figure 1:
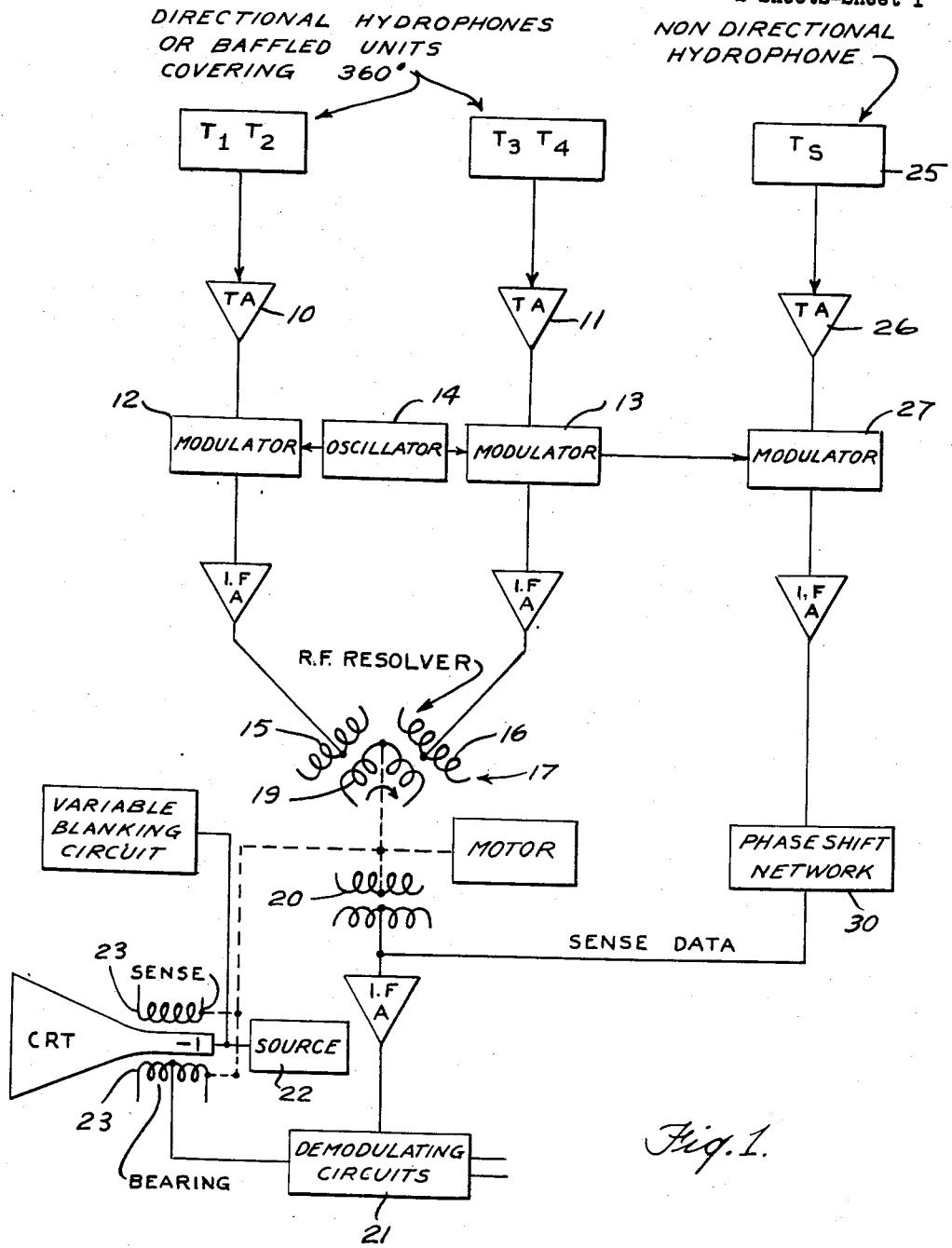
Figure 2:
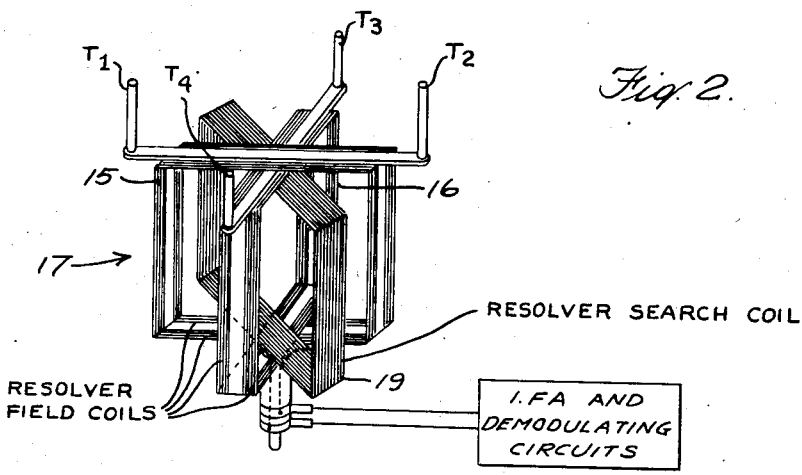
FIG. 2 is a diagram illustrating the hydrophone configuration in the sonar system.

Referring to the drawings the sonar system includes two pairs of cross loop connected hydrophones $T_1$, $T_2$ and $T_3$, $T_4$ which are each nondirectional in character and of small dimension compared to a wavelength. The two pairs of hydrophones are disposed at a fixed 90° relationship to each other (see FIG. 2) and are connected to amplifiers 10 and 11, respectively, which are capable of low frequency amplification. Modulators 12 and 13 receive the signal outputs of the amplifiers 10 and 11, respectively, and serve to impress the signal on a radio frequency carrier as side bands thereof supplied by local oscillator 14. Field coils 15 and 16 of resolver 17 receive the amplified carrier and R.F. side bands which has all of the information necessary to reconstruct the characteristics and direction of the input signal. A voltage is induced in the motor driven search coil 19 of the resolver which is supplied to transformer 20 and after additional amplification a demodulator 21 serves to recover the frequency translated signal and furnish a rectified current to a CRT energized by the source 22. The CRT has beam deflection controlling coils 23 rotated about the neck of the CRT by the rotor shaft of the search coil and is synchronized therewith.

Figure 3:
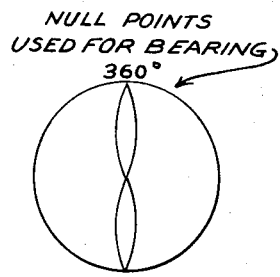
FIG. 3 illustrates a CRT display in a sonar system having no provision for resolving ambiguity.

A circle is thereby described on the CRT in synchronism with the search coil. Presence of a signal draws this circle inward by control of the CRT beam so that nulls are indicated by a lobe shaped like a propeller, that is the difference between a circle and a figure 8 described in a circle. See FIG. 3.

Figure 3A:
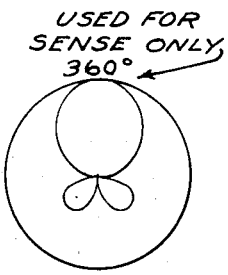
FIG. 3A illustrates a CRT display in a sonar system with ambiguity resolution.

A third circuit using a nondirectional hydrophone 25 is employed to eliminate the ambiguity which is present when the loop transducers are used alone. For this purpose, a low frequency amplifier 26 is connected to the output of the nondirectional hydrophone and introduces the frequency as an input to modulator 27 which is also connected to the modulator 13, the latter unit introducing the high frequency carrier with sidebands thereto. The modulator 27 serves to modulate the carrier and sidebands with the low frequency signal picked up by the nondirectional hydrophone and introduces the combined frequency into phase shift network 30 after amplification. The demodulating circuit 21 receives the phase shifted frequency from the network 30 after additional amplification. The provision of a nondirectional hydrophone channel serves to eliminate the 180° ambiguity in the display and cardioid response pattern thereon. See FIG. 3A.

Figure 4:
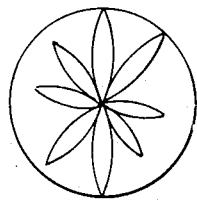
FIG. 4 illustrates a multiple target display on the CRT of the system which has no provision for selective target blanking.
Figure 4A:
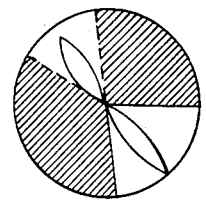
FIG. 4A illustrates a CRT display in a sonar system having selective blanking.

If desired a variable blanking circuit 32 may be used to control the CRT grid 14 so that, in lieu of the ungated response display shown in FIG. 4 for multiple targets, a single target may be selected with the other target displays blanked out as shown in FIG. 4A.

Various modifications of the present system can be effected by persons skilled in the art without departing from the scope and principle of invention as defined in the following claims.

What is claimed is:

1. A passive sonar detection and bearing system comprising a plurality of sound transducers, said sound transducers being arranged in pairs with said pairs being disposed at a 90° relationship with respect to each other, a radio frequency oscillator, a modulator connected to each pair of transducers and said oscillator, a goniometer having field coils connected separately to said modulators and a motor driven search coil, a demodulator circuit coupled to said search coil and a cathode ray tube having beam controlling coils rotatably disposed thereon and electrically connected to said demodulator circuit, the coils in the cathode ray tube being driven in synchronism with said search coil.

2. A passive sonar detection and bearing system comprising a plurality of sound transducers, said sound transducers being arranged in pairs with said pairs being disposed at a 90° relationship with respect to each other, a radio frequency oscillator, a modulator connected to each pair of transducers and said oscillator, a goniometer having field coils connected separately to said modulators and a motor driven search coil, a demodulator circuit coupled to said search coil and a cathode ray tube having beam controlling coils rotatably disposed thereon and electrically connected to said demodulator circuit, the coils in the cathode ray tube being driven in synchronism with said search coil, said system having means for resolving ambiguity.

3. A passive sonar detection and bearing system as claimed in claim 2 wherein said transducers are directional hydrophones, and said means for resolving ambiguity comprises an electrical channel having a nondirectional hydrophone, a third modulator connected to one of said first-mentioned modulators and a phase shift network connected to the input of said demodulator circuit.

4. A passive sonar detection and bearing system comprising a plurality of sound transducers, said sound transducers being arranged in pairs with said pairs being disposed at a 90° relationship with respect to each other, a radio frequency oscillator, a modulator connected to each pair of transducers and said oscillator, a goniometer having field coils connected separately to said modulators and a motor driven search coil, a demodulator circuit coupled to said search coil, a cathode ray tube having beam controlling coils rotatably disposed thereon and electrically connected to said demodulator circuit, the coils in the cathode ray tube being driven in synchronism with said search coil, said system having means for resolving ambiguity and a variable blanking circuit connected to the grid of said cathode ray tube.

References Cited in the file of this patent

UNITED STATES PATENTS

| | | |
|---|---|---|
| 2,502,447 | Frink | Apr. 4, 1950 |
| 2,808,583 | Mathes | Oct. 1, 1957 |